(12) United States Patent
Mao

(10) Patent No.: US 12,512,875 B2
(45) Date of Patent: Dec. 30, 2025

(54) NEAR FIELD COMMUNICATION NFC COMMUNICATION METHOD AND APPARATUS, AND ELECTRONIC DEVICE

(71) Applicant: VIVO MOBILE COMMUNICATION CO., LTD., Guangdong (CN)

(72) Inventor: Honggen Mao, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 348 days.

(21) Appl. No.: 17/979,856

(22) Filed: Nov. 3, 2022

(65) Prior Publication Data
US 2023/0054157 A1 Feb. 23, 2023

Related U.S. Application Data

(63) Continuation of application No. PCT/CN2021/091360, filed on Apr. 30, 2021.

(30) Foreign Application Priority Data

May 6, 2020 (CN) .......................... 202010374746.4

(51) Int. Cl.
*H04B 5/77* (2024.01)
*G06Q 20/32* (2012.01)
*G06Q 20/34* (2012.01)
*H04B 5/20* (2024.01)

(52) U.S. Cl.
CPC ........... *H04B 5/77* (2024.01); *G06Q 20/3278* (2013.01); *G06Q 20/351* (2013.01); *G06Q 20/352* (2013.01); *H04B 5/20* (2024.01)

(58) Field of Classification Search
CPC ........ H04B 5/72; H04B 5/77; G06Q 20/3278; G06Q 20/351; G06Q 20/326; G06Q 20/36; G06Q 20/3821; G06Q 20/3227; G06Q 20/3223; G06Q 20/352; G06Q 20/341; H04W 4/80; H04W 12/068; H04W 12/47
See application file for complete search history.

(56) References Cited

U.S. PATENT DOCUMENTS

2012/0034868 A1  2/2012  Fine et al.
2017/0206521 A1* 7/2017  Maddocks ............... H04W 4/80
2021/0136549 A1* 5/2021  Xu .......................... H04W 4/80
(Continued)

FOREIGN PATENT DOCUMENTS

| CN | 106231090 A | 12/2016 |
| CN | 109257071 A | 1/2019 |
| CN | 110020569 A | 7/2019 |

(Continued)

*Primary Examiner* — Nam T Huynh
(74) *Attorney, Agent, or Firm* — Price Heneveld LLP

(57) ABSTRACT

A near field communication NFC communication method and apparatus, and an electronic device are provided. The method includes: receiving a first signal sent by an NFC card reader; and in response to the first signal, performing data interaction with the NFC card reader using target contactless information in a case that a first NFC emulation card is in an active state; where the first NFC emulation card is a non-access-control-type NFC emulation card, and the target contactless information carries a target identification code corresponding to an access-control-type target NFC emulation card.

17 Claims, 3 Drawing Sheets

(56) References Cited

U.S. PATENT DOCUMENTS

2022/0180351 A1\* 6/2022 Zhou .................. G06K 7/10297
2022/0343317 A1\* 10/2022 Zhang .................. H04W 12/47

FOREIGN PATENT DOCUMENTS

| CN | 110781699 A | 2/2020 |
| CN | 111581994 A | 8/2020 |
| JP | H0546834 A | 2/1993 |
| JP | 2016006599 A | 1/2016 |
| KR | 20100028333 A | 3/2010 |

\* cited by examiner

NEAR FIELD COMMUNICATION NFC COMMUNICATION METHOD AND APPARATUS, AND ELECTRONIC DEVICE

CROSS-REFERENCE TO RELATED APPLICATIONS

This application is a continuation application of International Application No. PCT/CN2021/091360 filed on Apr. 30, 2021, which claims priority to Chinese Patent Application No. 202010374746.4, filed in China on May 6, 2020, which are incorporated herein by reference in their entireties.

TECHNICAL FIELD

This application relates to the field of communications technologies, and in particular, to a near field communication (NFC) communication method and apparatus, and an electronic device.

BACKGROUND

With rapid development of electronic devices, an increasing quantity of components are integrated in the electronic devices, for example, a variety of sensors such as cameras, infrared sensors, global positioning systems (GPS), Bluetooth, wireless fidelity (WIFI), fingerprints, near field communication, and Bluetooth low energy (BLE). These sensors greatly enhance user experience and functional richness of the electronic devices. If an embedded security chip is integrated for the NFC of the electronic device, the NFC can be used to emulate a bus card, an access control card, a bank card, an electronic identity card, and the like. NFC emulation of access control cards, bus cards, bank cards, electronic identity cards, and the like can facilitate users' life. However, at present, only one emulation card can be kept active by default for the NFC function. For example, when a proximity signal of an NFC card reader is received, contactless information of the emulation card in an active state is used by default to perform data interaction with the NFC card reader. If the emulation card currently in the active state is a bus card but the user requires an access control card to perform an access control release operation, the user needs to manually activate the access control card first, featuring a cumbersome operation process.

SUMMARY

Embodiments of this application are intended to provide a near field communication NFC communication method and apparatus, and an electronic device.

According to a first aspect, an embodiment of this application provides a near field communication NFC communication method, and the method includes:
  receiving a first signal sent by an NFC card reader; and
  in response to the first signal, performing data interaction with the NFC card reader using target contactless information in a case that a first NFC emulation card is in an active state; where
  the first NFC emulation card is a non-access-control-type NFC emulation card, and the target contactless information carries a target identification code corresponding to an access-control-type target NFC emulation card.

According to a second aspect, an embodiment of this application provides a near field communication NFC communications apparatus, including:
  a first receiving module, configured to receive a first signal sent by an NFC card reader; and
  a first response module, configured to, in response to the first signal, perform data interaction with the NFC card reader using target contactless information in a case that a first NFC emulation card is in an active state; where
  the first NFC emulation card is a non-access-control-type NFC emulation card, and the target contactless information carries a target identification code corresponding to an access-control-type target NFC emulation card.

According to a third aspect, an embodiment of this application provides an electronic device, where the electronic device includes a processor, a memory, and a program or an instruction stored in the memory and capable of running on the processor, and when the program or the instruction is executed by the processor, the steps of the method according to the first aspect are implemented.

According to a fourth aspect, an embodiment of this application provides a computer-readable storage medium, where a program or an instruction is stored in the computer-readable storage medium, and when the program or the instruction is executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or an instruction to implement the method according to the first aspect.

DETAILED DESCRIPTION OF EMBODIMENTS

The following describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein. In addition, "and/or" in this specification and claims indicates at least one of connected objects, and the symbol "/" generally indicates that the associated objects are in an "or" relationship.

The following describes in detail a near field communication NFC communication method provided in the embodiments of this application by using specific embodiments and application scenarios thereof with reference to the accompanying drawings.

This application provides a near field communication NFC communication method that can be applied to an electronic device. The electronic device integrates an NFC chip and an embedded security chip and supports functions of NFC emulation cards, for example, an NFC emulation card capable of emulating access control and an NFC emulation card capable of emulating transactions. For example, the NFC emulation card capable of emulating access control may be an access control card for releasing residential area access control, an access control card for releasing elevator access control, an access control card for releasing office access control, or the like; and the NFC emulation card capable of emulating transactions may be a bus card, a bank card, an electronic identity card, or the like. For example, the electronic device and an NFC card reader perform data interaction in accordance with related protocols such as ISO14443 and ISO7816.

Figure 1:
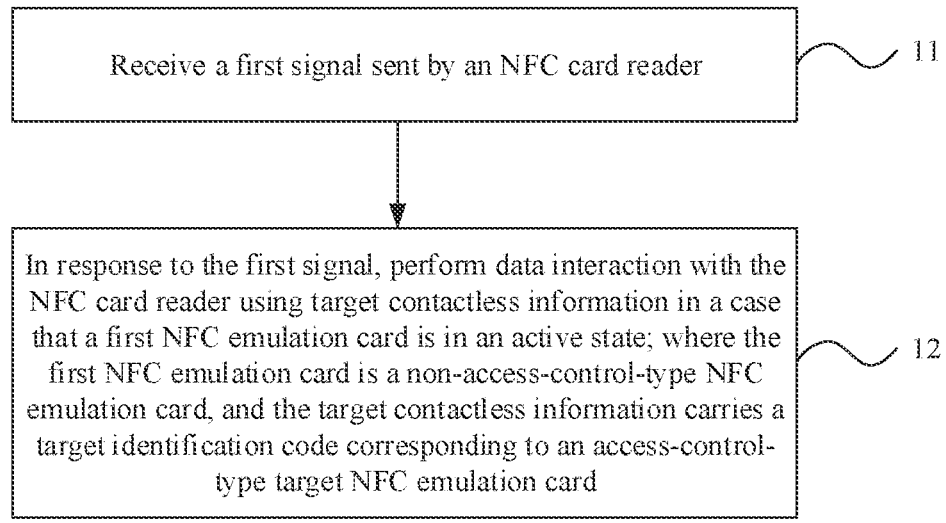
FIG. 1 is a flowchart of an NFC communication method according to an embodiment of this application.

As shown in FIG. 1, the method may specifically include:

Step 11: Receive a first signal sent by an NFC card reader.

For example, the first signal may be a request signal for establishing near field communication, being sent by the NFC card reader and received by the electronic device; or the first signal may be a proximity signal indicating that a distance between the NFC card reader and the electronic device is within a predetermined range.

For example, the NFC card reader may be a bus card reader, a subway gate, a UnionPay card reader, an access control card reader, or the like. The access control card reader may include an access control card reader for doors of a residential area, an access control card reader for office doors, an elevator access control card reader, and the like.

Step 12: In response to the first signal, perform data interaction with the NFC card reader using target contactless information in a case that a first NFC emulation card is in an active state.

The first NFC emulation card is a non-access-control-type NFC emulation card, and the target contactless information carries a target identification code corresponding to an access-control-type target NFC emulation card.

For example, the first NFC emulation card being in the active state may refer to a state in which the first NFC emulation card is currently available for use, or a state in which the electronic device is able to perform data interaction with the NFC card reader by using the contactless information corresponding to the first NFC emulation card. For example, the user selects a bus card as the first NFC emulation card. In a case that the bus card is in an active state, when the user uses the electronic device to make a payment by swiping the card on the NFC card reader, the bus card is used for transaction payment by default. For example, the user may select an NFC emulation card on an emulation card switching screen of an NFC application as an activated first NFC emulation card. If the first NFC emulation card is a transaction-type NFC emulation card, for example, a bus card, when the electronic device makes a payment by swiping the card on the NFC card reader, the bus card is used as the transaction-type NFC emulation card for payment.

For example, the target contactless information may include contactless protocol parameter information, for example, information such as a unique identification code, a rate, and whether ISO14443-4 layer protocol is supported. The electronic device performing data interaction with the NFC card reader using the target contactless information means the electronic device performing data interaction with the NFC card reader using the contactless protocol parameter information, for example, data transmission and reception are performed according to requirements of the ISO14443-3 protocol specification. For example, after the NFC card reader sends a type A card-specific request (Request Command, Type A, REQA) command to the electronic device, the electronic device needs to return a request answer (Answer To Request, Type A, ATQA) command as a response to the NFC card reader.

For example, the non-access-control-type NFC emulation card may be a transaction-type NFC emulation card, and the transaction-type NFC emulation card is an NFC emulation card for transaction and payment, for example, a bus card, a bank card, or an electronic identity card.

For example, the access-control-type NFC target emulation card may be an NFC emulation card capable of performing data interaction with at least two access-control-type NFC card readers and enabling the at least two access-control-type NFC card readers to release access control; or may be referred to as a universal access control card. Certainly, the access-control-type NFC target emulation card may alternatively be an NFC emulation card of a specific access control type, for example, an access control card for releasing residential area access control, or an access control card for releasing elevator access control, or an access control card for releasing office access control, which is not limited in this application.

For example, the target identification code may be used as verification information for releasing access control by the access-control-type NFC card reader. To be specific, the electronic device sends the target identification code to the access-control-type NFC card reader during data interaction with the access-control-type NFC card reader. The access-control-type NFC card reader can release access control in a case that the target identification code is verified successfully.

In this embodiment of this application, the first signal sent by the NFC card reader is received, and in response to the first signal, data interaction is performed with the NFC card reader using the target contactless information in the case that the first NFC emulation card is in the active state. Because the target contactless information carries the target identification code corresponding to the access-control-type target NFC emulation card, data interaction with the access-control-type NFC card reader can be implemented by using the non-access-control-type NFC emulation card, so as to enable an access-control-type NFC card reader to release access control. This avoids a cumbersome process that the user has to manually activate the access-control-type NFC emulation card before performing an access control release operation.

For example, in order to implement releasing of access control such as residential area access control, office access control, or elevator access control by using any one NFC emulation card, the user may preset a universal access control card for releasing a plurality of access controls. For example, the electronic device may be usually bound to a plurality of different access control cards, and the user may preselect one of the plurality of access control cards as a universal access control card. A target identification code in contactless information corresponding to the universal access control card may be used as verification information for releasing access control by NFC card readers of the plurality of access control types, so as to implement releasing of the plurality of access controls by using one NFC emulation card.

For example, in a case that the first NFC emulation card currently in the active state is a non-access-control-type NFC emulation card, a first identification code in first contactless information corresponding to the first NFC emulation card may be replaced by the target identification code, so as to implement releasing of a plurality of access controls using the non-access-control-type NFC emulation card. In this way, access control can be implemented without switching of the NFC emulation cards, thereby simplifying user operations.

For example, before the performing data interaction with the NFC card reader using target contactless information in a case that a first NFC emulation card is in an active state, the method may further specifically include:
  receiving a first input by a user;
  in response to the first input, updating a first identification code in first contactless information corresponding to the first NFC emulation card to the target identification code, where the first identification code is a non-access-control-type identification code; and
  in the case that the first NFC emulation card is in the active state, determining that the first contactless information updated is the target contactless information.

For example, the first NFC emulation card may be a transaction-type NFC emulation card, for example, a bus card, a bank card, or an electronic identity card. Using the first NFC emulation card being a bus card as an example, if the first input by the user for setting a universal access control card is received, in response to the first input, the target identification code in the contactless information corresponding to the universal access control card is sent to an NFC chip by using an extension command of the NFC protocol, so as to substitute the target identification code for an identification code, stored in the NFC chip, in contactless information corresponding to the bus card. In this way, in a case that the bus card is in an active state, the target identification code is carried in the contactless information of the bus card so that the access control release function is available.

In this embodiment of this application, an identification code in contactless information corresponding to the non-access-control-type NFC emulation card can be changed to the target identification code in advance, so that the non-access-control-type NFC emulation card has the access control release function. In this way, the non-access-control-type NFC emulation card being in the active state can be used to release access control, avoiding a cumbersome process that the user has to manually activate the access-control-type NFC emulation card before performing an access control release operation.

Preferably, alternatively, during binding of an NFC emulation card, an identification code in contactless information corresponding to the NFC emulation card is updated to the target identification code, so that each NFC emulation card bound to the electronic device has the access control release function. In this way, no matter which NFC emulation card is in an active state, the card can be used to release access control. This avoids the need of switching the NFC emulation cards before releasing access control, thereby simplifying the user operation.

For example, in a case that one NFC emulation card in the electronic device is an access-control-type NFC emulation card, the one access-control-type NFC emulation card may be recorded as being set by the user as a universal access control card and its corresponding target identification code is also recorded.

For example, the NFC protocol specifies that in a case of switching to and activating a transaction-type NFC emulation card, contactless information corresponding to the switched-to transaction-type NFC emulation card needs to be updated. Therefore, when the switched-to transaction-type NFC emulation card is in an active state, its corresponding contactless parameter also needs to be updated, where the contactless parameter is a protocol parameter other than the identification code in the contactless information.

Specifically, in an implementation, before the performing data interaction with the NFC card reader using target contactless information in a case that a first NFC emulation card is in an active state, the method may further specifically include:
  receiving a second input by a user; and
  in response to the second input, switching to the first NFC emulation card to make it enter an active state, determining that first contactless information corresponding to the first NFC emulation card is the target contactless information, and updating a first identification code in the target contactless information to the target identification code; where
  the first identification code is an identification code corresponding to the first emulation card.

For example, if the user needs to switch to a transaction-type NFC emulation card, if the switched-to bank card is in an active state, contactless information in the NFC chip can be updated to contactless information corresponding to the bank card according to the NFC protocol. Then, the target identification code corresponding to the universal access control card is sent to the NFC chip by using an NFC extension command, and an identification code in the contactless information corresponding to the bank card is updated in the NFC chip to the target identification code corresponding to the universal access control card.

In this embodiment of this application, in the case that the NFC emulation card is switched to be in the active state, an identification code in contactless information corresponding to the NFC emulation card can be changed to the target identification code, so that the NFC emulation card in the active state has an access control release function, avoiding a cumbersome process that the user has to manually activate the access-control-type NFC emulation card before performing an access control release operation.

Specifically, in another implementation, before the performing data interaction with the NFC card reader using target contactless information in a case that a first NFC emulation card is in an active state, the method may further specifically include:
  receiving a third input by a user in a case that a second NFC emulation card is in an active state, where second contactless information corresponding to the second NFC emulation card carries the target identification code; and
  in response to the third input, switching to the first NFC emulation card to make it enter an active state, updating a second contactless parameter to a first contactless parameter, and determining that the first contactless parameter and the target identification code are the target contactless information; where the second contactless parameter is a contactless parameter other than the target identification code in the second contactless information, the first contactless parameter is a contactless parameter other than a first identification code in first contactless information corresponding to the first NFC emulation card, and the first identification code is an identification code corresponding to the first NFC emulation card.

For example, when a current transaction-type second NFC emulation card is in an active state, for example, the second NFC emulation card is a bus card, and contactless information corresponding to the bus card carries the target identification code corresponding to the universal access control card. A first switching input by the user for switching the bus card to a first NFC emulation card of another transaction type to enter an active state is received, where, for example, the first NFC emulation card may be a bank card. In response to the first switching input, because the contactless information of the bus card currently being in the active state already carries the target identification code, the target identification code can be kept and not updated, and a contactless parameter other than the target identification code in the contactless information corresponding to the bus card is updated to a contactless parameter other than an identification code in contactless information corresponding to the bank card.

For another example, a second switching input by the user for switching an access-control-type NFC emulation card currently in an active state to a transaction-type NFC emulation card, for example, a bus card, to enter an active state is received. In response to the second switching input, the NFC chip retains the target identification code in the access-control-type NFC emulation card, and after contactless information in the NFC chip is updated to contactless information of the bus card, the target identification code is sent to the NFC chip by using an NFC extension command, so as to replace an identification code in the contactless parameter of the bus card in the NFC chip.

In this embodiment of this application, when the second NFC emulation card carrying the target identification code in the contactless information is switched to a non-access-control-type NFC emulation card in the active state, the target identification code is retained and not updated while only contactless information other than the identification code in the corresponding contactless information is updated, so that the NFC emulation card in the active state has an access control release function, avoiding a cumbersome process that the user has to manually activate the access-control-type NFC emulation card before performing an access control release operation.

The following specifically describes the method of updating contactless information with reference to other NFC emulation card switching scenarios:

Scenario 1: A third switching input by the user for switching a transaction-type NFC emulation card, for example, a bus card, currently in an active state to an access-control-type NFC emulation card to enter an active state is received. In response to the third switching input, the NFC chip updates contactless information corresponding to the bus card to contactless information corresponding to the access-control-type NFC emulation card according to the NFC protocol, not requiring additional processing.

Scenario 2: A fourth switching input by the user for switching a transaction-type NFC emulation card currently in an active state to a non-access-control-type NFC emulation card, for example, a bus card, is received, where contactless information corresponding to the transaction-type NFC emulation card carries the target identification code corresponding to the universal access control card. In response to the fourth switching input, the NFC chip retains the target identification code corresponding to the universal access control card, and updates contactless information in the NFC chip to a contactless parameter other than an identification code in contactless information corresponding to the bus card. Alternatively, in response to the fourth switching input, the contactless information in the NFC chip is updated to the contactless information corresponding to the bus card, and the identification code in the contactless information corresponding to the bus card is updated to the target identification code.

In this embodiment of this application, the identification code in the contactless information corresponding to the NFC emulation card is replaced in the NFC chip, so as to ensure that the contactless information corresponding to the NFC emulation card in the active state carries the target identification code corresponding to the universal access control card. In this way, it is ensured that the non-access-control-type NFC emulation card has the access control release function, for example, the bus card may be set to have the access control release function, or the bank card may be set to have the access control release function. This avoids a cumbersome process that the user has to manually activate the access-control-type NFC emulation card before performing an access control release operation. In addition, compared with the solution of card switching based on geographic location or protocol, this application does not affect a card swiping speed.

For example, the step of performing data interaction with the NFC card reader using the target contactless information may specifically include:

performing first data interaction with the NFC card reader using first target information in the target contactless information, and recording an interaction count of the first data interaction, where the first target information carries the target identification code; and in a case that the interaction count of the first data interaction meets a preset condition, performing second data interaction with the NFC card reader using second target information in the target contactless information, where the second target information is contactless information corresponding to the first NFC emulation card.

For example, after the user sets a universal access control card, contactless information corresponding to the universal access control card is sent to the NFC chip by using an NFC extension command, and the NFC chip saves the contactless information of the universal access control card. In a case that the user selects a non-access-control-type NFC emulation card to enter an active state, for example, selects a transaction-type NFC emulation card (such as a bus card or a bank card) to enter an active state, the contactless information in the NFC chip is updated to contactless information of the selected transaction-type NFC emulation card according to the NFC protocol, and the contactless information is stored in the NFC chip. In this way, two sets of contactless information are stored in the NFC chip, namely the first target information (which is the contactless information corresponding to the universal access control card) and the second target information (which is the contactless information corresponding to the transaction-type NFC emulation card).

In the case that the first signal of the NFC card reader is received, the first target information (which is the contactless parameters corresponding to the universal access control card) is first used to perform protocol-layer interaction (for example, performing ISO14443-3 layer protocol interaction) with the NFC card reader (for example, an access control card reader or a bus reader). In a case that the number of first data interactions performed between the electronic device and the NFC card reader using the first target information reaches a predetermined quantity of times, the second target information (which is the contactless information corresponding to the transaction-type NFC emulation card) is then used for performing second data interaction, for example, performing ISO14443-3 layer interaction. The electronic device feeds back an identification code of the transaction-type NFC emulation card to the NFC card reader, and the NFC card reader performs application data interaction and the like in response to the identification code.

In this way, in a case that the NFC card reader is an access-control-type NFC card reader, only the target identification code needs to be verified for the access-control-type NFC card reader; therefore, after the electronic device returns the target identification code, the NFC card reader releases access control in response to the target identification code, that is, a door is successfully opened. This is repeated for a predetermined quantity of times (a specific quantity of times may be fixed or may be determined through verification by the user to whom the access control device is provided) to ensure that the NFC card reader is able to release access control. In a case that the NFC card reader is a transaction-type NFC card reader, after the first data interaction is performed for the predetermined quantity of times, the second data interaction can be directly performed to ensure that the electronic device can perform a payment operation, thereby avoiding a cumbersome process that the user has to manually activate the access-control-type NFC emulation card before performing an access control release operation.

For example, the performing first data interaction with the NFC card reader using first target information in the target contactless information, and recording an interaction count of the first data interaction may specifically include:

establishing a handshake-based connection to the NFC card reader using a first contactless parameter in the first target information, where the first contactless parameter does not include the target identification code;

in a case that the handshake-based connection has been established, sending the target identification code to the NFC card reader; and disconnecting the handshake-based connection and incrementing the interaction count of the first data interaction by 1.

For example, in the process that protocol-layer interaction is performed with the NFC card reader by using the first target information (which is the contactless parameters corresponding to the universal access control card), when ISO14443-3 layer protocol interaction between the electronic device and the NFC card reader is performed until the electronic device is required to feed back the target identification code carried in the first target information, after the electronic device feeds back the target identification code to the NFC card reader, the current handshake-based connection is disconnected. A process of establishing a handshake-based connection, feeding back the target identification code, and disconnecting the handshake-based connection is recorded as one completed first data interaction. Disconnecting the handshake-based connection may be skipping responding to an ISO14443-3 layer protocol selection instruction sent by the card reader, disconnecting a connection to the NFC card reader, or the like.

For example, when at least two NFC emulation cards are bound to the electronic device, for example, including at least one access control card and one bus card, the access control card may be preferably used as the universal access control card.

When the current bus card is in an active state, the user performs data interaction with the access control card reader by using the bus card in the electronic device, and the electronic device returns the target identification code of the universal access control card to the access control card reader in the data interaction process within the predetermined quantity of times, so that the access control card reader can release access control. When the current bus card is in an active state, the user performs data interaction with the bus card reader by using the bus card in the electronic device, and the target identification code of the universal access control card is returned to the access control card reader in the data interaction process within a predetermined quantity of times to enter a transaction procedure of the bus card, so that the electronic device can also swipe the card on the bus card reader to make a payment successfully. In this way, the user can select the bus card to enter an active state, so as to implement both access control release for the access control card reader by using the bus card and payment by swiping the card on the bus card reader, avoiding a cumbersome process that the user has to manually activate the access-control-type NFC emulation card before performing an access control release operation.

Figure 2:
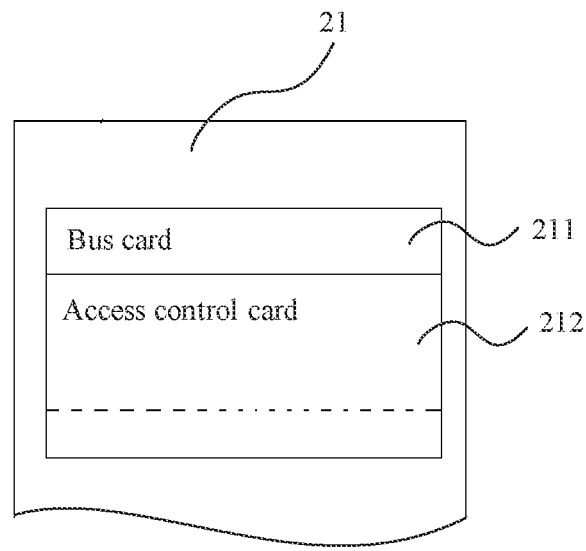
FIG. 2 is a first schematic diagram of an NFC emulation card screen according to an embodiment of this application.
Figure 3:
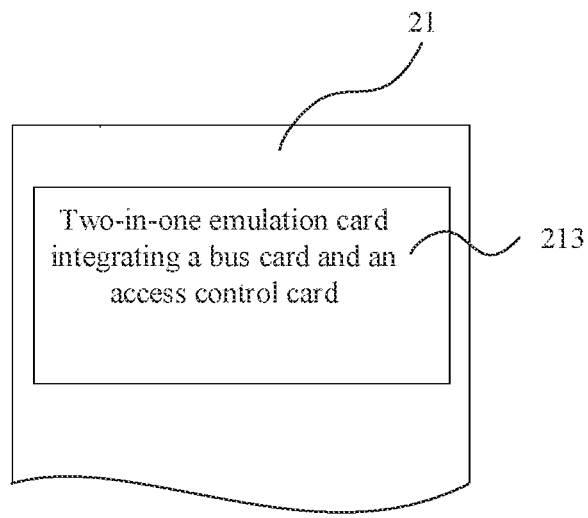
FIG. 3 is a second schematic diagram of an NFC emulation card screen according to an embodiment of this application.

For example, in a case that two sets of contactless parameters are stored in the NFC chip, for example, a contactless parameter of the universal access control card and a contactless parameter of the bus card, an NFC emulation card screen 21 (such as a user card package screen) of an NFC application may still display two NFC emulation cards, namely, one access control card 212 and one bus card 211, as shown in FIG. 2; or may hide the universal access control card and the bus card to display a new two-in-one emulation card 213 integrating the bus card and the access control card, as shown in FIG. 3.

For example, the user may alternatively select a plurality of access control cards or all access control cards as the universal access control card, and a contactless parameter of each universal access control card is stored in the NFC chip in this case. When a selected non-access-control-type NFC emulation card, for example, a bus card, is used for data interaction, according to the foregoing embodiments of this application, ISO14443-3 layer interaction may be performed based on the contactless parameter of the universal access control card for the predetermined quantity of times, a corresponding target identification code is then returned, and finally a normal transaction procedure of the bus card is performed. Details are not repeated herein.

In this embodiment of this application, two or more sets of contactless information are stored in the NFC chip, and when the electronic device performs data interaction with the NFC card reader, contactless information corresponding to the access-control-type NFC emulation card is first used for interaction, and then contactless information corresponding to a transaction-type NFC emulation card is used for data interaction, that is, to perform a normal transaction process. This ensures that access control can be released when the NFC card reader is an access-control-type card reader, and that a transaction procedure can also be performed when the NFC reader is a transaction-type NFC card reader, thereby avoiding a cumbersome process that the user has to manually activate the access-control-type NFC emulation card before performing an access control release operation. This can also avoid compatibility problems and features flexibility due to availability of a plurality of universal access control cards for choosing.

It should be noted that, for the NFC communication method provided in the embodiments of this application, the execution body may be an NFC communications apparatus, or a control module for executing the NFC communication method in the NFC communications apparatus. In this embodiment of this application, the NFC communication method provided in the embodiments of this application is described by using the NFC communication method being executed by the NFC communications apparatus as an example.

Figure 4:
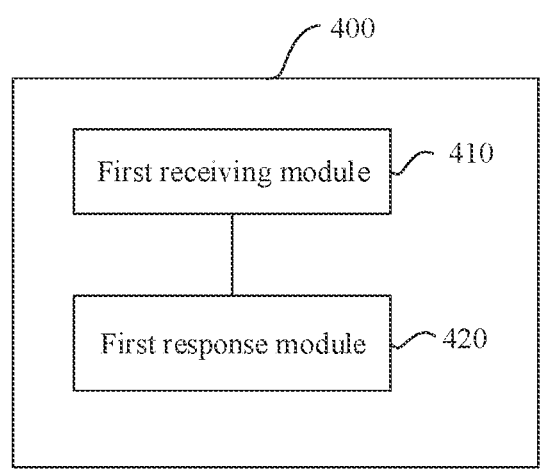
FIG. 4 is a block diagram of an NFC communications apparatus according to an embodiment of this application.

As shown in FIG. 4, an embodiment of this application provides a near field communication NFC communications apparatus 400, including:
- a first receiving module 410, configured to receive a first signal sent by an NFC card reader; and
- a first response module 420, configured to, in response to the first signal, perform data interaction with the NFC card reader using target contactless information in a case that a first NFC emulation card is in an active state; where
- the first NFC emulation card is a non-access-control-type NFC emulation card, and the target contactless information carries a target identification code corresponding to an access-control-type target NFC emulation card.

For example, the apparatus 400 further includes:
- a second receiving module, configured to receive a first input by a user before data interaction is performed with the NFC card reader using the target contactless information in the case that the first NFC emulation card is in the active state;
- a second response module, configured to, in response to the first input, update a first identification code in first contactless information corresponding to the first NFC emulation card to the target identification code, where the first identification code is a non-access-control-type identification code; and
- a determining module, configured to: in the case that the first NFC emulation card is in the active state, determine that the first contactless information updated is the target contactless information.

For example, the apparatus 400 further includes:
- a third receiving module, configured to receive a second input by a user before data interaction is performed with the NFC card reader using the target contactless information in the case that the first NFC emulation card is in the active state; and
- a third response module, configured to: in response to the second input, switch to the first NFC emulation card to make it enter an active state, determine that first contactless information corresponding to the first NFC emulation card is the target contactless information, and update a first identification code in the target contactless information to the target identification code; where
- the first identification code is an identification code corresponding to the first emulation card.

For example, the apparatus 400 further includes:
- a fourth receiving module, configured to: before data interaction is performed with the NFC card reader using the target contactless information in the case that the first NFC emulation card is in the active state, receive a third input by a user in a case that a second NFC emulation card is in an active state, where second contactless information corresponding to the second NFC emulation card carries the target identification code; and
- a fourth response module, configured to, in response to the third input, switch to the first NFC emulation card to make it enter an active state, update a second contactless parameter to a first contactless parameter, and determine that the first contactless parameter and the target identification code are the target contactless information; where
- the second contactless parameter is a contactless parameter other than the target identification code in the second contactless information, the first contactless parameter is a contactless parameter other than a first identification code in first contactless information corresponding to the first NFC emulation card, and the first identification code is an identification code corresponding to the first NFC emulation card.

For example, the first response module 420 includes:
- a first processing submodule, configured to perform first data interaction with the NFC card reader using first target information in the target contactless information, and record an interaction count of the first data interaction, where the first target information carries the target identification code; and
- a second processing submodule, configured to: in a case that the interaction count of the first data interaction meets a preset condition, perform second data interaction with the NFC card reader using second target information in the target contactless information, where the second target information is contactless information corresponding to the first NFC emulation card.

For example, the first processing submodule includes:
- a connection unit, configured to establish a handshake-based connection to the NFC card reader using a first contactless parameter in the first target information, where the first contactless parameter does not include the target identification code;
- a sending unit, configured to: in a case that the handshake-based connection has been established, send the target identification code to the NFC card reader; and
- a processing unit, configured to disconnect the handshake-based connection and increment the interaction count of the first data interaction by 1.

The NFC communications apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The NFC communications apparatus in this embodiment of this application may be an apparatus with an operating system. The operating system may be an Android operating system, an iOS operating system, or other possible operating systems, and is not specifically limited in the embodiments of this application.

The NFC communications apparatus provided in this embodiment of this application is capable of implementing the processes that are implemented by the NFC communications apparatus in the method embodiment of FIG. 1. To avoid repetition, details are not described herein again.

The NFC communications apparatus in this embodiment of this application receives the first signal sent by the NFC card reader, and in response to the first signal, performs data interaction with the NFC card reader using the target contactless information in the case that the first NFC emulation card is in the active state. Because the target contactless information carries the target identification code corresponding to the access-control-type target NFC emulation card, data interaction with the access-control-type NFC card reader can be implemented by using the non-access-control-type NFC emulation card, so as to enable an access-control-type NFC card reader to release access control. This avoids a cumbersome process that the user has to manually activate the access-control-type NFC emulation card before performing an access control release operation.

For example, an embodiment of this application further provides an electronic device, including a processor, a memory, and a program or an instruction stored in the memory and capable of running on the processor. When the program or the instruction is executed by the processor, the processes of the foregoing embodiment of the NFC communication method are implemented, with the same technical effects achieved. To avoid repetition, details are not described herein again.

It should be noted that the electronic device in this embodiment of this application includes the aforementioned mobile electronic device and non-mobile electronic device.

Figure 5:
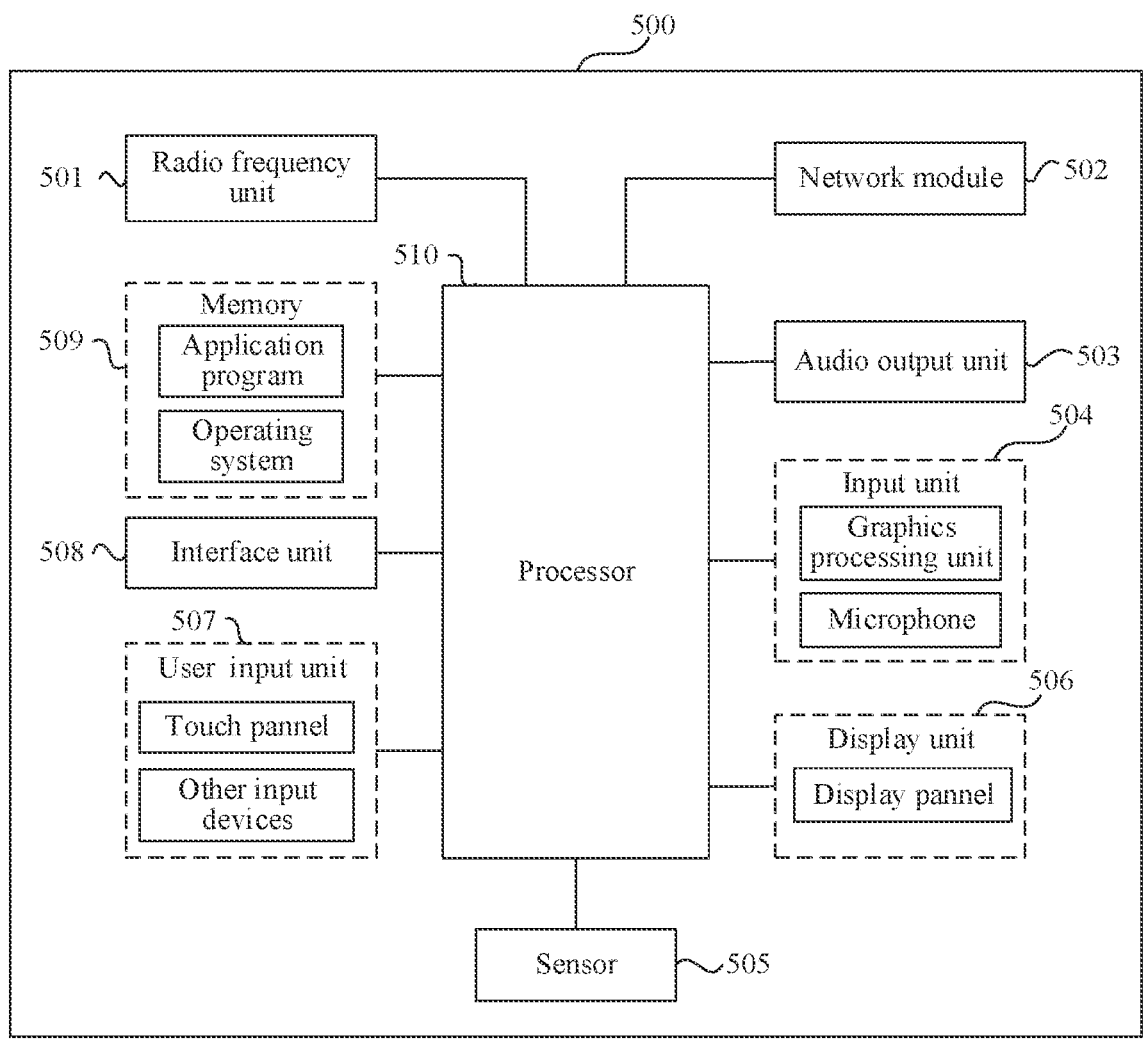
FIG. 5 is a block diagram of a hardware structure of an electronic device according to an embodiment of this application.

FIG. 5 is a schematic diagram of a hardware structure of an electronic device for implementing the embodiments of this application.

The electronic device 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

A person skilled in the art can understand that the electronic device 500 may further include a power supply (for example, a battery) supplying power to all components, and the power supply may be logically connected to the processor 510 through a power management system. In this way, functions such as charge management, discharge management, and power consumption management are implemented by using the power management system. The structure of the electronic device shown in FIG. 5 does not constitute any limitation on the electronic device. The electronic device may include more or fewer components than those shown in the figure, or a combination of some components, or the components disposed differently. Details are not repeated herein.

The radio frequency unit 501 is configured to receive a first signal sent by an NFC card reader.

The processor 510 is configured to: in response to the first signal, perform data interaction with the NFC card reader using target contactless information by using the radio frequency unit 501 in a case that a first NFC emulation card is in an active state; where the first NFC emulation card is a non-access-control-type NFC emulation card, and the target contactless information carries a target identification code corresponding to an access-control-type target NFC emulation card.

In this embodiment of this application, the first signal sent by the NFC card reader is received, and in response to the first signal, data interaction is performed with the NFC card reader using the target contactless information in the case that the first NFC emulation card is in the active state. Because the target contactless information carries the target identification code corresponding to the access-control-type target NFC emulation card, data interaction with the access-control-type NFC card reader can be implemented by using the non-access-control-type NFC emulation card, so as to enable an access-control-type NFC card reader to release access control. This avoids a cumbersome process that the user has to manually activate the access-control-type NFC emulation card before performing an access control release operation.

For example, the input unit 504 is configured to receive a first input by a user.

The processor 510 is further configured to: in response to the first input, update a first identification code in first contactless information corresponding to the first NFC emulation card to the target identification code, where the first identification code is a non-access-control-type identification code; and in the case that the first NFC emulation card is in the active state, determine that the first contactless information updated is the target contactless information.

In this embodiment of this application, an identification code in contactless information corresponding to the non-access-control-type NFC emulation card can be changed to the target identification code in advance, so that the non-access-control-type NFC emulation card has the access control release function. In this way, the non-access-control-type NFC emulation card being in the active state can be used to release access control, avoiding a cumbersome process that the user has to manually activate the access-control-type NFC emulation card before performing an access control release operation.

For example, the input unit 504 is further configured to receive a second input by a user.

The processor 510 is further configured to: in response to the second input, switch to the first NFC emulation card to make it enter an active state, determine that first contactless information corresponding to the first NFC emulation card is the target contactless information, and update a first identification code in the target contactless information to the target identification code; where the first identification code is an identification code corresponding to the first emulation card.

In this embodiment of this application, in the case that the NFC emulation card is switched to be in the active state, an identification code in contactless information corresponding to the NFC emulation card can be changed to the target identification code, so that the NFC emulation card in the active state has an access control release function, avoiding a cumbersome process that the user has to manually activate the access-control-type NFC emulation card before performing an access control release operation.

For example, the input unit 504 is further configured to receive a third input by a user in a case that a second NFC emulation card is in an active state, where second contactless information corresponding to the second NFC emulation card carries the target identification code.

The processor 510 is further configured to: in response to the third input, switch to the first NFC emulation card to make it enter an active state, update a second contactless parameter to a first contactless parameter, and determine that the first contactless parameter and the target identification code are the target contactless information; where the second contactless parameter is a contactless parameter other than the target identification code in the second contactless information, the first contactless parameter is a contactless parameter other than a first identification code in first contactless information corresponding to the first NFC emulation card, and the first identification code is an identification code corresponding to the first NFC emulation card.

In this embodiment of this application, when the second NFC emulation card carrying the target identification code in the contactless information is switched to a non-access-control-type NFC emulation card in the active state, the target identification code is retained and not updated while only contactless information other than the identification code in the corresponding contactless information is updated, so that the NFC emulation card in the active state has an access control release function, avoiding a cumbersome process that the user has to manually activate the access-control-type NFC emulation card before performing an access control release operation.

For example, the processor 510 is further configured to perform first data interaction with the NFC card reader using first target information in the target contactless information by using the radio frequency unit 501, and record an interaction count of the first data interaction, where the first target information carries the target identification code; and in a case that the interaction count of the first data interaction meets a preset condition, perform second data interaction with the NFC card reader using second target information in the target contactless information by using the radio frequency unit 501, where the second target information is contactless information corresponding to the first NFC emulation card.

For example, the processor 510 is further configured to: establish a handshake-based connection to the NFC card reader using a first contactless parameter in the first target information by using the radio frequency unit 501, where the first contactless parameter does not include the target identification code; in a case that the handshake-based connection has been established, send the target identification code to the NFC card reader; and disconnect the handshake-based connection and increment the interaction count of the first data interaction by 1.

In this embodiment of this application, two or more sets of contactless information are stored in the NFC chip, and when the electronic device performs data interaction with the NFC card reader, contactless information corresponding to the access-control-type NFC emulation card is first used for interaction, and then contactless information corresponding to a transaction-type NFC emulation card is used for data interaction, that is, to perform a normal transaction process. This ensures that access control can be released when the NFC card reader is an access-control-type card reader, and that a transaction procedure can also be performed when the NFC reader is a transaction-type NFC card reader, thereby avoiding a cumbersome process that the user has to manually activate the access-control-type NFC emulation card before performing an access control release operation. This can also avoid compatibility problems and features flexibility in choosing from a plurality of universal access control cards.

An embodiment of this application further provides a readable storage medium, where a program or an instruction is stored in the readable storage medium. When the program or the instruction is executed by a processor, the processes of the foregoing embodiment of the NFC communication method are implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or an instruction of a network device to implement the processes of the foregoing embodiments of the NFC communication method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application. For hardware implementation, a module, a unit, a submodule, a subunit, and the like may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A near field communication (NFC) communication method, comprising:
   receiving a first signal sent by an NFC card reader; and
   in response to the first signal, performing data interaction with the NFC card reader using target contactless information during a time that a first NFC emulation card is in an active state; wherein
   the first NFC emulation card is a transaction-type NFC emulation card, and the target contactless information carries a target identification code corresponding to an access-control-type target NFC emulation card;
   before the performing data interaction with the NFC card reader using target contactless information during a time that a first NFC emulation card is in an active state, further comprising:
   receiving a first input by a user;
   in response to the first input, updating a first identification code in first contactless information corresponding to the first NFC emulation card to the target identification code, wherein the first identification code is a non-access-control-type identification code; and
   in the case that the first NFC emulation card is in the active state, determining that the first contactless information updated is the target contactless information.

2. The method according to claim 1, before the performing data interaction with the NFC card reader using target contactless information during a time that a first NFC emulation card is in an active state, further comprising:
   receiving a second input by a user; and
   in response to the second input, switching to the first NFC emulation card to make it enter an active state, determining that first contactless information corresponding to the first NFC emulation card is the target contactless information, and updating a first identification code in the target contactless information to the target identification code; wherein
   the first identification code is an identification code corresponding to the first emulation card.

3. The method according to claim 1, before the performing data interaction with the NFC card reader using target contactless information during a time that a first NFC emulation card is in an active state, further comprising:
   receiving a third input by a user during a time that a second NFC emulation card is in an active state, wherein second contactless information corresponding to the second NFC emulation card carries the target identification code; and
   in response to the third input, switching to the first NFC emulation card to make it enter an active state, updating a second contactless parameter to a first contactless parameter, and determining that the first contactless parameter and the target identification code are the target contactless information; wherein the second contactless parameter is a contactless parameter other than the target identification code in the second contactless information, the first contactless parameter is a contactless parameter other than a first identification code in first contactless information corresponding to the first NFC emulation card, and the first identification code is an identification code corresponding to the first NFC emulation card.

4. The method according to claim 1, wherein the performing data interaction with the NFC card reader using target contactless information comprises:
   performing first data interaction with the NFC card reader using first target information in the target contactless information, and recording an interaction count of the first data interaction, wherein the first target information carries the target identification code; and
   in a case that the interaction count of the first data interaction meets a preset condition, performing second data interaction with the NFC card reader using second target information in the target contactless information, wherein the second target information is contactless information corresponding to the first NFC emulation card.

5. The method according to claim 4, wherein the performing first data interaction with the NFC card reader using first target information in the target contactless information, and recording an interaction count of the first data interaction comprises:
   establishing a handshake-based connection to the NFC card reader using a first contactless parameter in the first target information, wherein the first contactless parameter does not comprise the target identification code;
   in a case that the handshake-based connection has been established, sending the target identification code to the NFC card reader; and
   disconnecting the handshake-based connection and incrementing the interaction count of the first data interaction by 1.

6. An electronic device, comprising a processor, a memory, and a program or an instruction stored in the memory and capable of running on the processor, wherein when the program or the instruction is executed by the processor, causes the electronic device to perform:
   receiving a first signal sent by an NFC card reader; and
   in response to the first signal, performing data interaction with the NFC card reader using target contactless information during a time that a first NFC emulation card is in an active state; wherein
   the first NFC emulation card is a transaction-type NFC emulation card, and the target contactless information carries a target identification code corresponding to an access-control-type target NFC emulation card;
   before the performing data interaction with the NFC card reader using target contactless information during a time that a first NFC emulation card is in an active state, wherein, when the program or the instruction is executed by the processor, causes the electronic device to further perform:
   receiving a first input by a user;
   in response to the first input, updating a first identification code in first contactless information corresponding to the first NFC emulation card to the target identification code, wherein the first identification code is a non-access-control-type identification code; and in the case that the first NFC emulation card is in the active state, determining that the first contactless information updated is the target contactless information.

7. The electronic device according to claim 6, before the performing data interaction with the NFC card reader using target contactless information during a time that a first NFC emulation card is in an active state, wherein, when the program or the instruction is executed by the processor, causes the electronic device to further perform:
receiving a second input by a user; and
in response to the second input, switching to the first NFC emulation card to make it enter an active state, determining that first contactless information corresponding to the first NFC emulation card is the target contactless information, and updating a first identification code in the target contactless information to the target identification code; wherein
the first identification code is an identification code corresponding to the first emulation card.

8. The electronic device according to claim 6, before the performing data interaction with the NFC card reader using target contactless information during a time that a first NFC emulation card is in an active state, wherein, when the program or the instruction is executed by the processor, causes the electronic device to further perform:
receiving a third input by a user during a time that a second NFC emulation card is in an active state, wherein second contactless information corresponding to the second NFC emulation card carries the target identification code; and
in response to the third input, switching to the first NFC emulation card to make it enter an active state, updating a second contactless parameter to a first contactless parameter, and determining that the first contactless parameter and the target identification code are the target contactless information; wherein
the second contactless parameter is a contactless parameter other than the target identification code in the second contactless information, the first contactless parameter is a contactless parameter other than a first identification code in first contactless information corresponding to the first NFC emulation card, and the first identification code is an identification code corresponding to the first NFC emulation card.

9. The electronic device according to claim 6, wherein the performing data interaction with the NFC card reader using target contactless information comprises:
performing first data interaction with the NFC card reader using first target information in the target contactless information, and recording an interaction count of the first data interaction, wherein the first target information carries the target identification code; and
in a case that the interaction count of the first data interaction meets a preset condition, performing second data interaction with the NFC card reader using second target information in the target contactless information, wherein the second target information is contactless information corresponding to the first NFC emulation card.

10. The electronic device according to claim 9, wherein the performing first data interaction with the NFC card reader using first target information in the target contactless information, and recording an interaction count of the first data interaction comprises:
establishing a handshake-based connection to the NFC card reader using a first contactless parameter in the first target information, wherein the first contactless parameter does not comprise the target identification code;
in a case that the handshake-based connection has been established, sending the target identification code to the NFC card reader; and
disconnecting the handshake-based connection and incrementing the interaction count of the first data interaction by 1.

11. A readable storage medium, wherein a program or an instruction is stored in the readable storage medium, and when the program or the instruction is executed by a processor, causes the readable storage medium to perform:
receiving a first signal sent by an NFC card reader; and
in response to the first signal, performing data interaction with the NFC card reader using target contactless information during a time that a first NFC emulation card is in an active state; wherein
the first NFC emulation card is a transaction-type NFC emulation card, and the target contactless information carries a target identification code corresponding to an access-control-type target NFC emulation card;
before the performing data interaction with the NFC card reader using target contactless information during a time that a first NFC emulation card is in an active state, wherein, when the program or the instruction is executed by a processor, causes the readable storage medium to further perform:
receiving a first input by a user;
in response to the first input, updating a first identification code in first contactless information corresponding to the first NFC emulation card to the target identification code, wherein the first identification code is a non-access-control-type identification code; and
in the case that the first NFC emulation card is in the active state, determining that the first contactless information updated is the target contactless information.

12. The readable storage medium according to claim 11, before the performing data interaction with the NFC card reader using target contactless information during a time that a first NFC emulation card is in an active state, wherein, when the program or the instruction is executed by a processor, causes the readable storage medium to further perform:
receiving a second input by a user; and
in response to the second input, switching to the first NFC emulation card to make it enter an active state, determining that first contactless information corresponding to the first NFC emulation card is the target contactless information, and updating a first identification code in the target contactless information to the target identification code; wherein
the first identification code is an identification code corresponding to the first emulation card.

13. The readable storage medium according to claim 11, before the performing data interaction with the NFC card reader using target contactless information during a time that a first NFC emulation card is in an active state, wherein, when the program or the instruction is executed by a processor, causes the readable storage medium to further perform:
receiving a third input by a user during a time that a second NFC emulation card is in an active state, wherein second contactless information corresponding to the second NFC emulation card carries the target identification code; and in response to the third input, switching to the first NFC emulation card to make it enter an active state, updating a second contactless parameter to a first contactless parameter, and determining that the first contactless parameter and the target identification code are the target contactless information; wherein the second contactless parameter is a contactless parameter other than the target identification code in the second contactless information, the first contactless parameter is a contactless parameter other than a first identification code in first contactless information corresponding to the first NFC emulation card, and the first identification code is an identification code corresponding to the first NFC emulation card.

14. The readable storage medium according to claim 11, wherein the performing data interaction with the NFC card reader using target contactless information comprises:

performing first data interaction with the NFC card reader using first target information in the target contactless information, and recording an interaction count of the first data interaction, wherein the first target information carries the target identification code; and in a case that the interaction count of the first data interaction meets a preset condition, performing second data interaction with the NFC card reader using second target information in the target contactless information, wherein the second target information is contactless information corresponding to the first NFC emulation card.

15. The readable storage medium according to claim 14, wherein the performing first data interaction with the NFC card reader using first target information in the target contactless information, and recording an interaction count of the first data interaction comprises:

establishing a handshake-based connection to the NFC card reader using a first contactless parameter in the first target information, wherein the first contactless parameter does not comprise the target identification code;

in a case that the handshake-based connection has been established, sending the target identification code to the NFC card reader; and disconnecting the handshake-based connection and incrementing the interaction count of the first data interaction by 1.

16. A chip, wherein the chip comprises a processor and a communications interface, the communications interface is coupled to the processor, and the processor is configured to execute a program or an instruction to implement the steps of the near field communication (NFC) communication method according to claim 1.

17. A communications apparatus, wherein the communications apparatus is configured to perform the steps of the near field communication (NFC) communication method according to claim 1.

* * * * *